(12) United States Patent
Lin (10) Patent No.: US 11,550,165 B2
(45) Date of Patent: Jan. 10, 2023

(54) ADJUSTMENT SOUND-GENERATING TEMPLE

(71) Applicant: Shu-Ting Lin, Tainan (TW)

(72) Inventor: Shu-Ting Lin, Tainan (TW)

( * ) Notice: Subject to any disclaimer, the term of this patent is extended or adjusted under 35 U.S.C. 154(b) by 108 days.

(21) Appl. No.: 17/111,544

(22) Filed: Dec. 4, 2020

(65) Prior Publication Data

US 2022/0179236 A1 Jun. 9, 2022

(51) Int. Cl.
*G02C 5/22* (2006.01)

(52) U.S. Cl.
CPC ....... *G02C 5/2263* (2013.01); *G02C 2200/04* (2013.01)

(58) Field of Classification Search
CPC .. G02C 5/2263; G02C 2200/04; G02C 5/146; G02C 5/16; G02C 5/20
USPC .................................................. 351/120, 121
See application file for complete search history.

(56) References Cited

U.S. PATENT DOCUMENTS

| | | | | |
|---|---|---|---|---|
| 4,153,347 A * | 5/1979 | Myer | ....................... | G02C 1/08 16/259 |
| 5,980,038 A * | 11/1999 | Chen | ..................... | G02C 5/2263 351/120 |
| 6,290,356 B1 | 9/2001 | Chi | | |
| 6,543,896 B1 * | 4/2003 | Huang | ..................... | G02C 5/20 351/111 |
| 6,837,579 B1 * | 1/2005 | Chen | ........................ | G02C 5/20 351/120 |
| 6,883,914 B1 * | 4/2005 | Yang | .................... | G02C 5/2263 351/120 |
| 7,300,150 B1 | 11/2007 | Chen | | |
| 7,396,125 B1 | 7/2008 | Tang | | |
| 7,543,932 B1 | 6/2009 | Isabelle | | |
| 7,896,491 B1 * | 3/2011 | Lin | ...................... | G02C 5/2263 351/120 |
| 2004/0145699 A1 * | 7/2004 | Wu | .......................... | G02C 5/20 351/120 |
| 2006/0221299 A1 * | 10/2006 | Wang-Lee | ........... | G02C 5/2263 351/120 |
| 2008/0074608 A1 * | 3/2008 | Chen | .................... | G02C 5/2263 351/120 |
| 2014/0185002 A1 * | 7/2014 | McNeal | ................... | G02C 5/16 29/428 |

* cited by examiner

*Primary Examiner* — George G. King (57) ABSTRACT

A adjustment sound-generating temple includes a hinge member, a connecting seat and a temple. The hinge member has a saw teeth and a pivot pins on one surface, the connecting seat is provided with an insert slot on one end and an extension rod on the other, which has two saw teeth on each of its inner side. The temple is assembled by combining the hinge member and the connecting seat. The completed temple is then connected to the frame, forming a spectacle that makes clicking sounds when adjusting the temple's angle. The clicking sounds help to enhance the quality of the spectacle as a whole.

2 Claims, 8 Drawing Sheets

ADJUSTMENT SOUND-GENERATING TEMPLE

BACKGROUND OF THE INVENTION

1. Field of the Invention

This invention relates to a temple that makes a clicking sound when adjusting the angle, or more specifically, a temple that allows fine adjustment of the temple's angle while making clicking sounds during adjustment, making the process more tangible to the user.

2. Description of the Prior Art

Spectacles are no longer exclusive to the myopic. Many young people use them as accessories, while workers involved in operations that generate powder or inimical metal particles treat safety glasses as one of their essential gears. Wearing uncomfortable glasses eight hours a day at work can be torture, especially for those who are not myopic. Hence, improving the comfortableness and functions of glasses remains the focus of research and development in the industry.

SUMMARY OF THE INVENTION

The objective of this invention is to offer a temple that allows fine adjustment of the temple's angle while making clicking sounds during adjustment.

The main characteristics of the invention is provides a hinge member that is fastened to the pivot portion of the frame. The hinge member is provided with a pivot part, which has a saw teeth and a pivot pins at one end. The connecting seat that is combined with the hinge member, the connecting seat has an insert slot on the front and an extension rod at the end. The saw teeth on the two sides of its inner part, a pivot hole on the connecting seat is designed to receive a pivot pins. The temple that receives the extension rod of the connecting seat.

BRIEF DESCRIPTION OF DRAWINGS

This invention will be understood by referring to the accompanying drawings, wherein.

DETAILED DESCRIPTION OF THE PREFERRED EMBODIMENT

As shown in FIGS. 1 to 8, The example of the present invention mainly consists of a hinge member 1, a connecting seat 2, and a temple 3. The hinge member 1 is inserted into a positioning slot A0 on the frame A, it is made of a stiff material, such as PC. The hinge member 1 is provided with a pivot part 10 on one side, which has a saw teeth 11 and a pivot pins 12 at the end. The pivot pins 12 on the hinge member 1 including a concave surface 13 and a stopping surface 14 on the backside. The connecting seat 2 is connected to the hinge member 1, it is made of a material softer than PC, such as nylon. The connecting seat 2 is provided with an insert slot 20 and an extension rod 21, the inner surfaces of the insert slot 20 is formed with a saw teeth 200 and 201. The connecting seat 2 further includes a pivot hole 22 on one side. The extension rod 21 on the connecting seat 2 is inserted into the temple 3.

To assemble the present invention, insert the hinge member 1 into the insert slot 20 of the connecting seat 2 by pushing the pivot pins 12 into the insert slot 20, which can be easily received by the concave surface 13 of the hinge member 1. The pivot pins 12 will be pushed into the pivot hole 22 and fixed into place by the stopping surface 14, after which the saw teeth 11 of the hinge member 1 is secured onto the saw teeth 200 on the connecting seat 2. Then, insert the extension rod 21 of the connecting seat 2 into the temple 3 so that connecting seat 2 and the temple 3 become a complete piece, before finally fastening the pivot part 10 of the hinge member 1 into the pivot portion A0 of frame A. The spectacles are completed by securing the hinge to the frame with a screw member.

Figure 1:
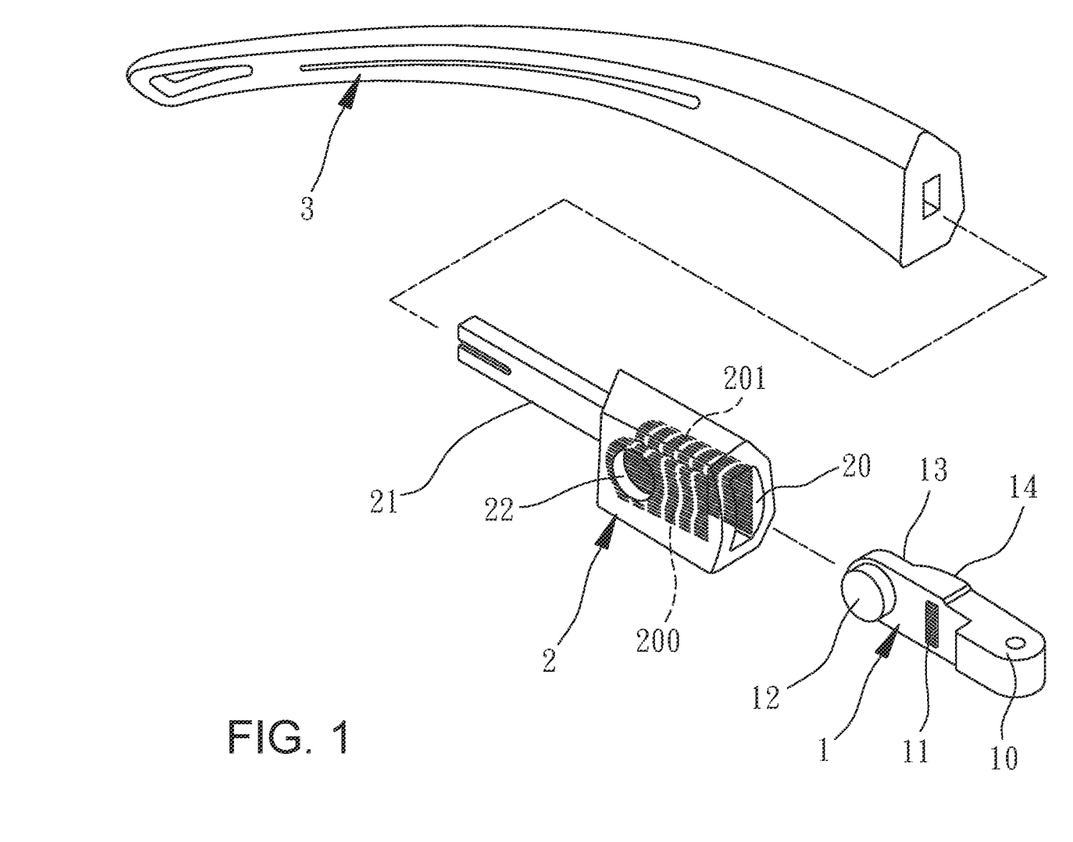
FIG. 1 is an exploded view of the hinge member, the connecting seat, and the temple in the present invention.
Figure 2:
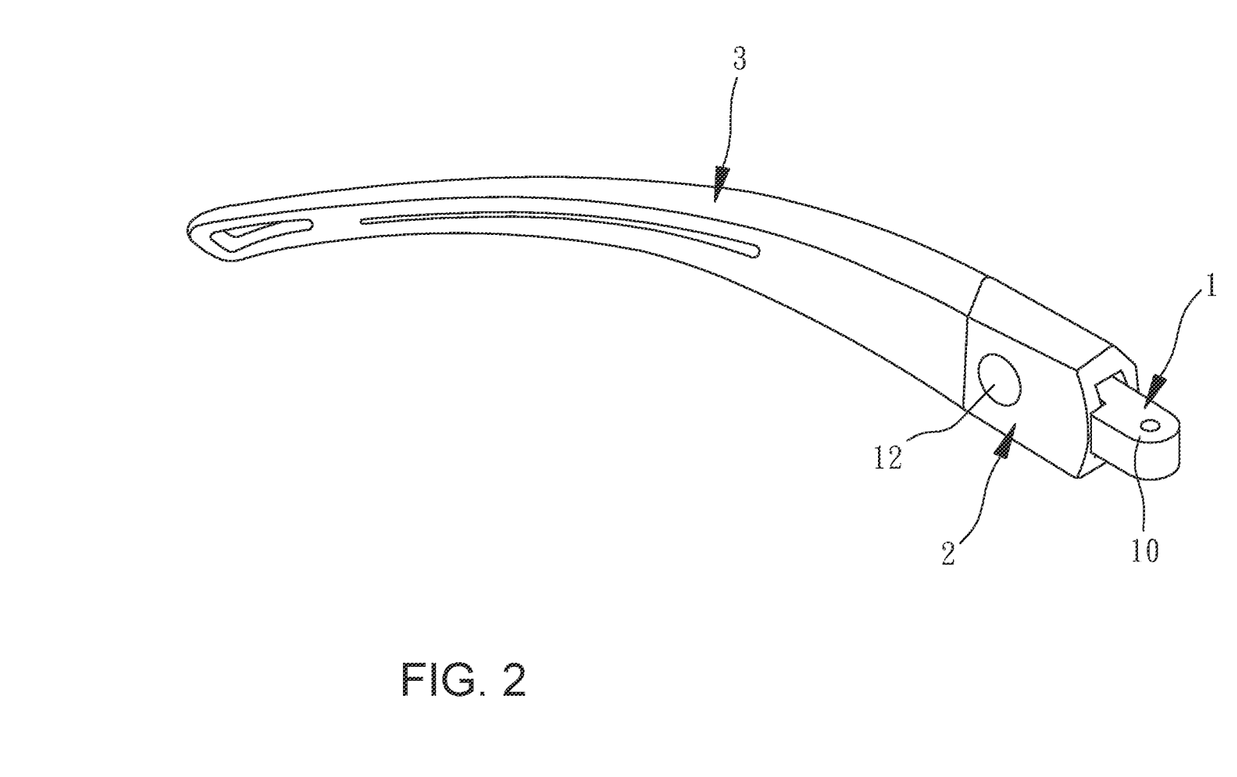
FIG. 2 is a perspective view of the hinge member, the connecting seat, and the temple in the present invention.
Figure 3:
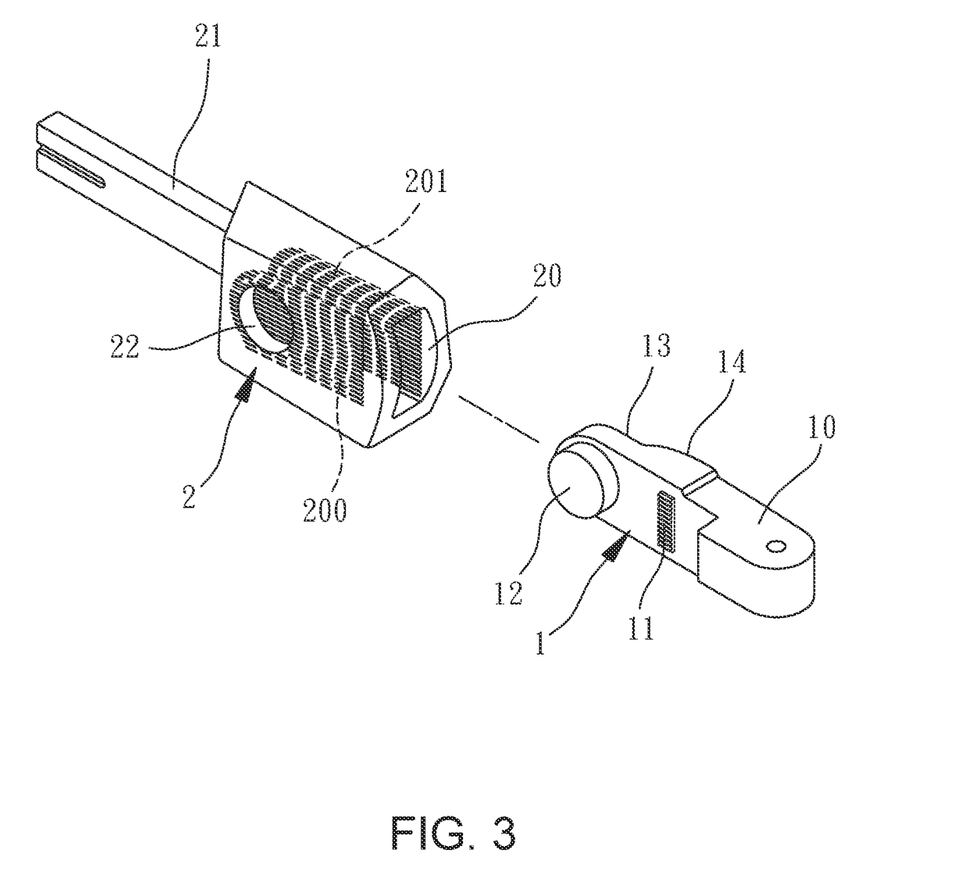
FIG. 3 is an exploded view of the hinge member and the connecting seat.
Figure 4:
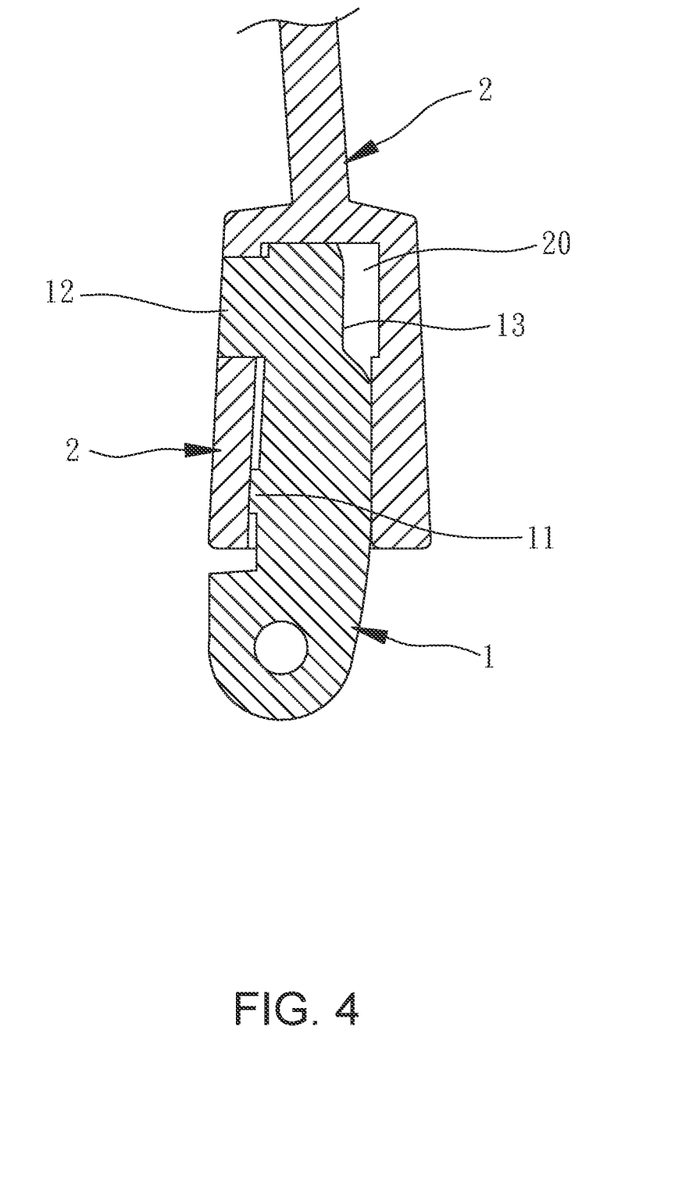
FIG. 4 is a sectional view illustrating the hinge member and the connecting seat from above.
Figure 5:
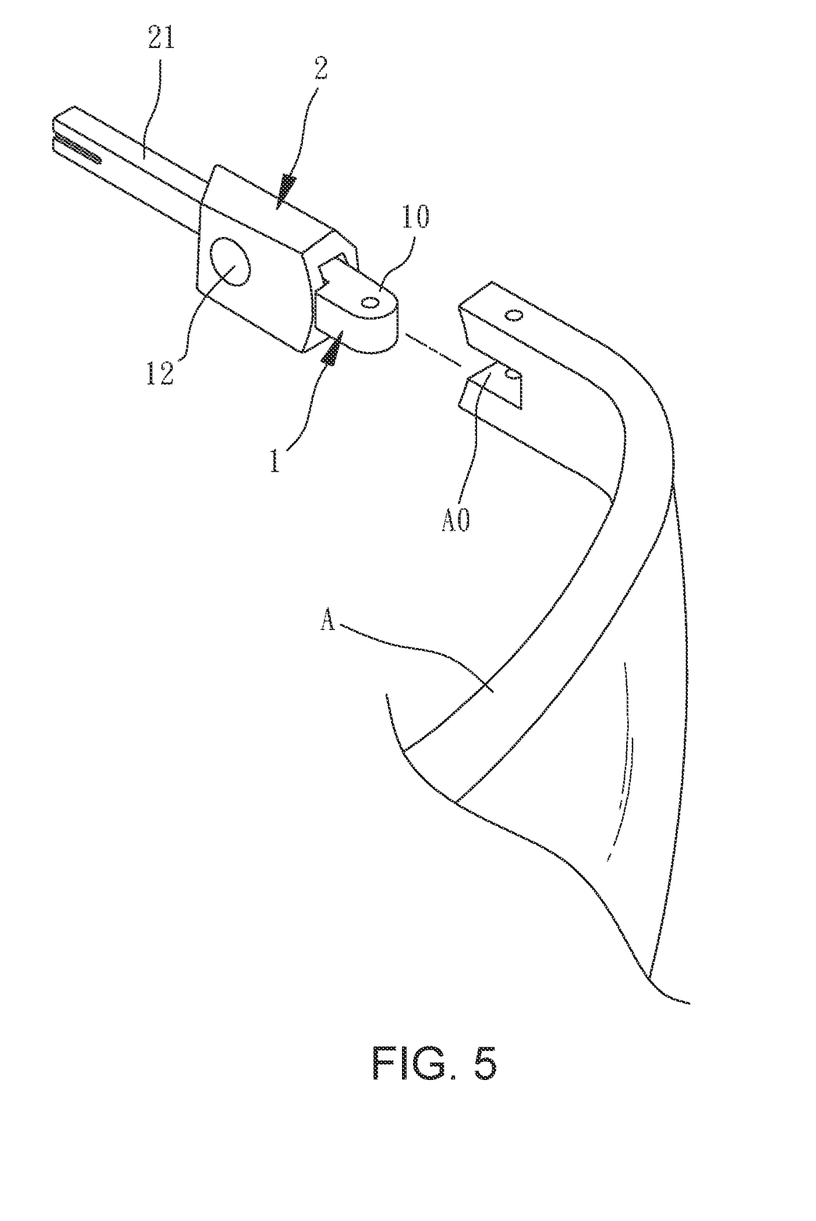
FIG. 5 is an exploded view illustrating how the hinge member is connected to the pivot portion of frame after having been combined with the connecting seat.
Figure 6:
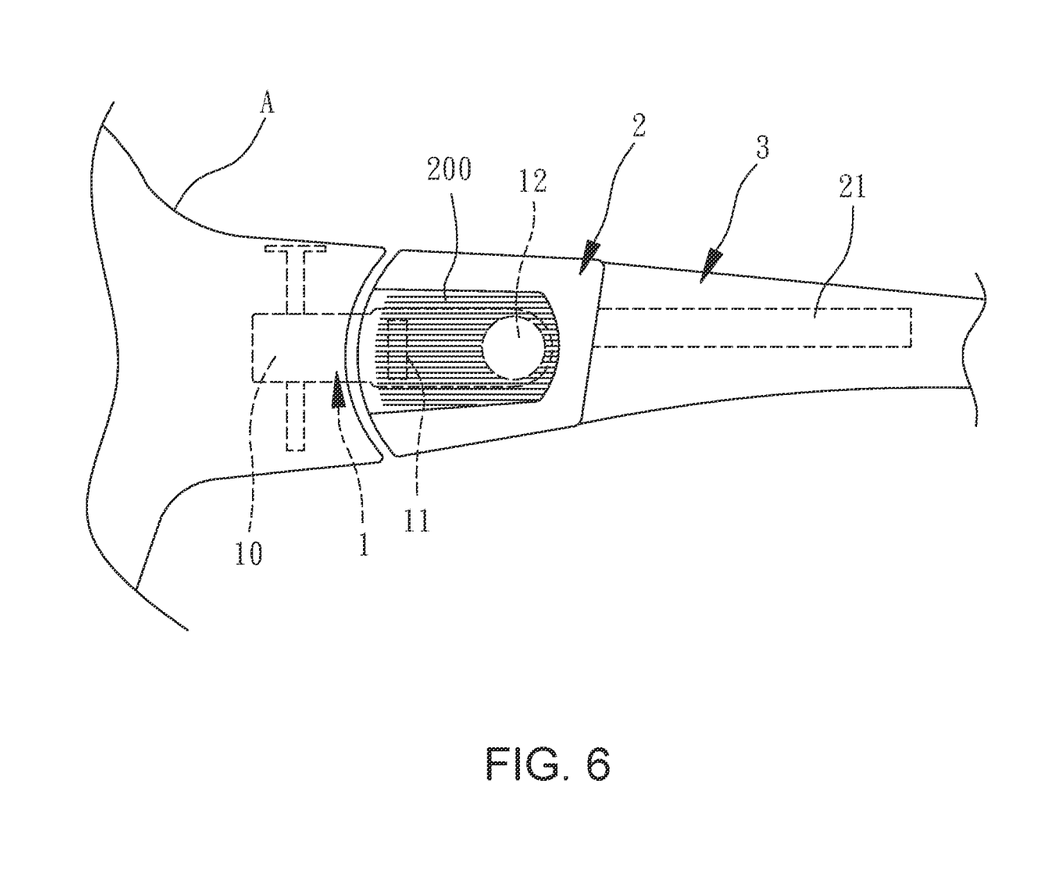
FIG. 6 is an illustration showing the side view of the assembled in the present invention.
Figure 7:
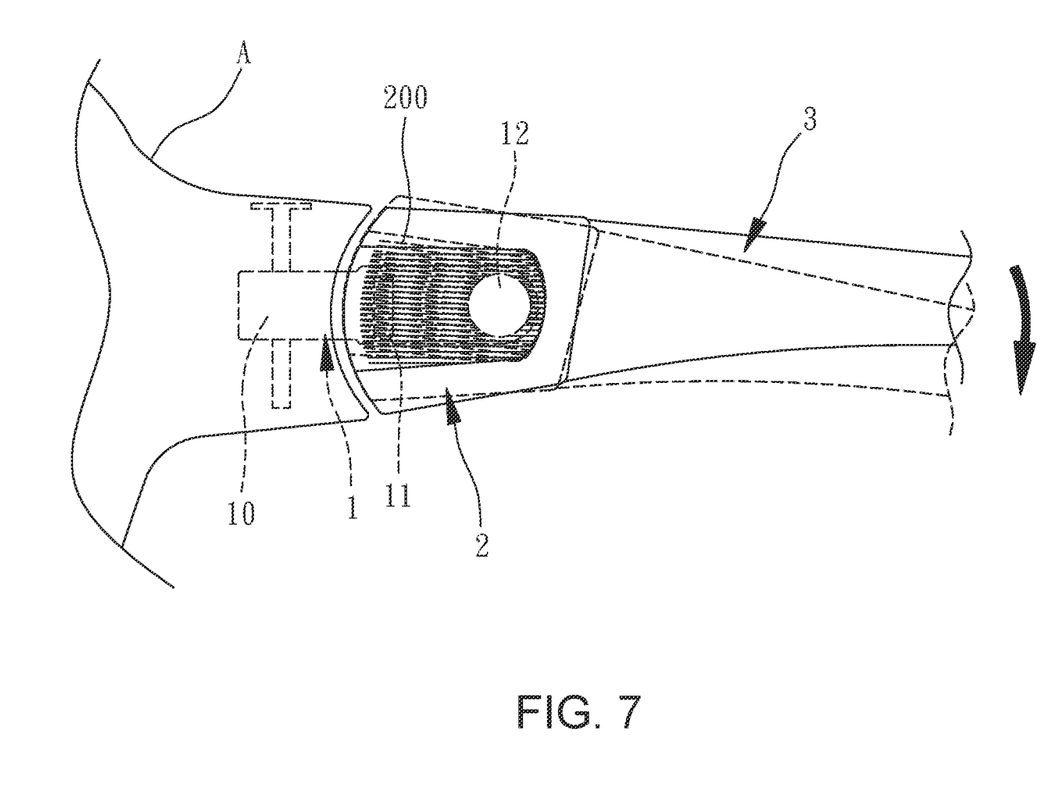
FIG. 7 is an illustration demonstrating the side view of the assembled invention when bent down.
Figure 8:
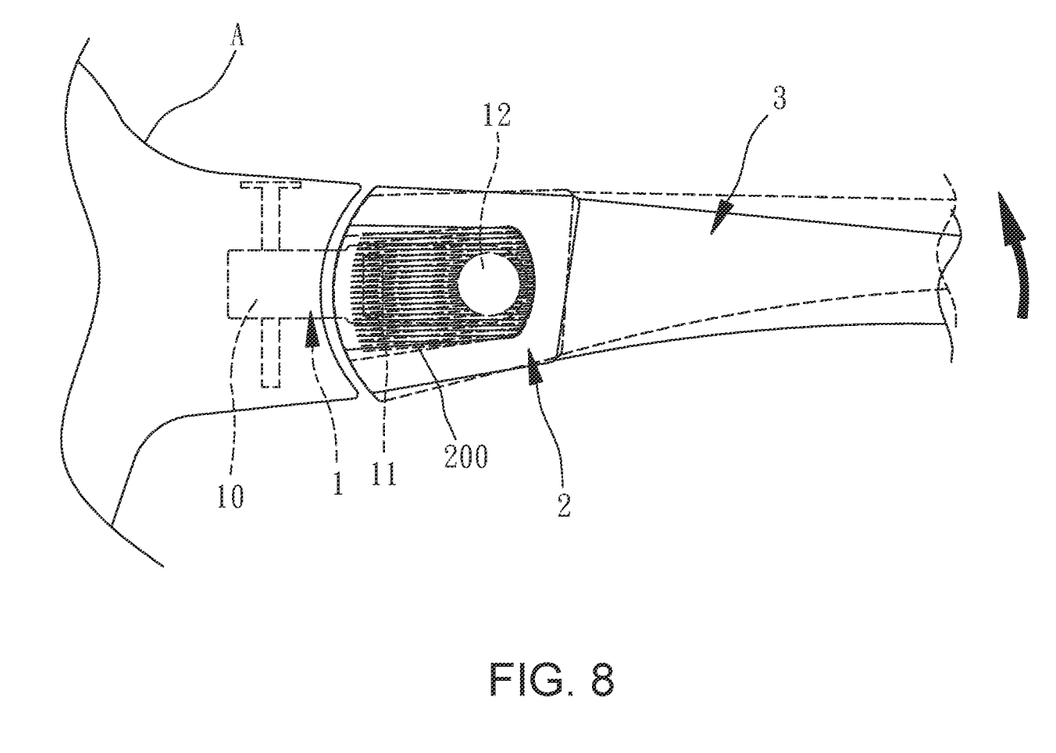
FIG. 8 is an illustration showing the side view of the assembled invention when pushed upward.

Users can adjust the angle of the temple 3 according to their needs. When adjusting the temple 3, the saw teeth 11 on the hinge member 1 and saw teeth 200 on the connecting seat 2 will make a clicking sound when sliding into place, so the users can enjoy the sound produced during adjustment.

The invention has the following advantages as can be seen from the foresaid description:

1. The hinge member 1 is made of a stiff material and the connecting seat 2 of a flexible material, the saw teeth 11 on the hinge member 1 and saw teeth 200 on the connecting seat 2 will make a ticking sound when sliding into place.

2. The pivot part 10 of the hinge member 1 and the saw teeth 200 of the connecting seat 2 give users more flexibility when adjusting the angle of the temple 3 according to their preferences thanks to their densely lined grooves.

3. The surface with a saw teeth 11 of the hinge member 1 works with the saw teeth 200 of the connecting seat 2 to make clicking sounds when sliding into place.

While the preferred embodiment of the invention has been described above, it will be recognized and understood that various modifications may be made therein and the appended claims are intended to cover all such modifications that may fall within the spirit and scope of the invention.

What is claimed is:

1. An adjustment sound-generating temple comprising:
    a hinge member that is fastened to a pivot portion of a frame, said hinge member is provided with a pivot part, which has a first set of saw teeth and a pivot pin at one end;
    a connecting seat that is combined with said hinge member, said connecting seat has an insert slot on the front and an extension rod at the end, a second set of saw teeth on two sides of an inner part of said connecting seat, a pivot hole on said connecting seat is designed to receive said pivot pin; and
    a temple that receives said extension rod of the said connecting seat;

wherein said hinge member made of polycarbonate material, giving it higher stiffness than said frame and/or said connecting member.

2. The adjustment sound-generating temple as claimed in claim 1, wherein said hinge member with a concave surface and a stopping surface on the other side, making it easier for said hinge member to go through said connecting seat and fix into said insert slot and the holding component.

* * * * *